United States Patent Office 3,519,914
Patented July 7, 1970

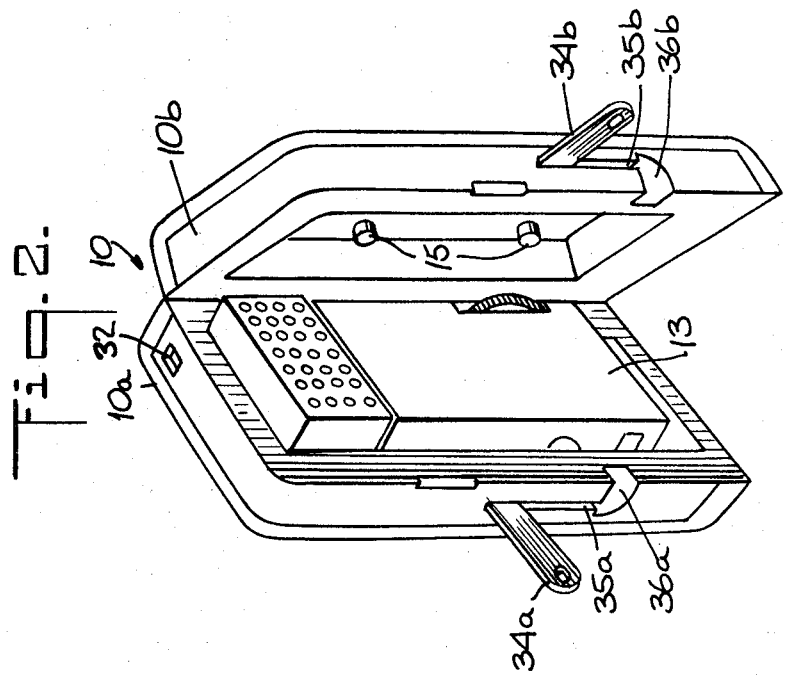
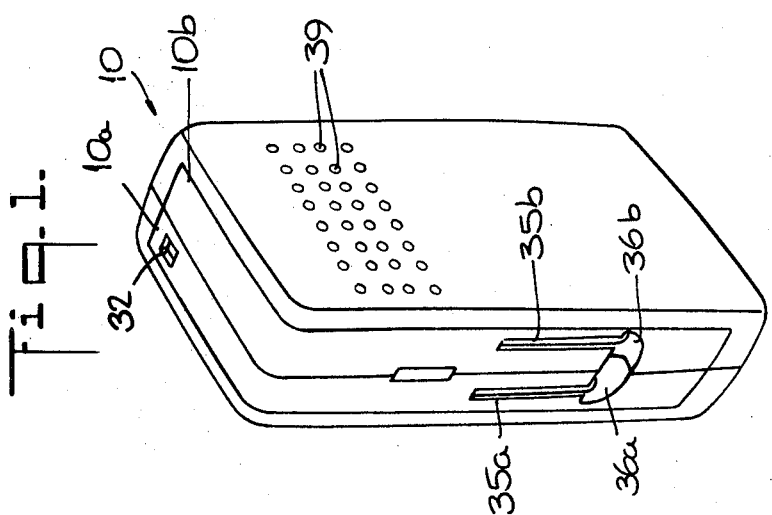

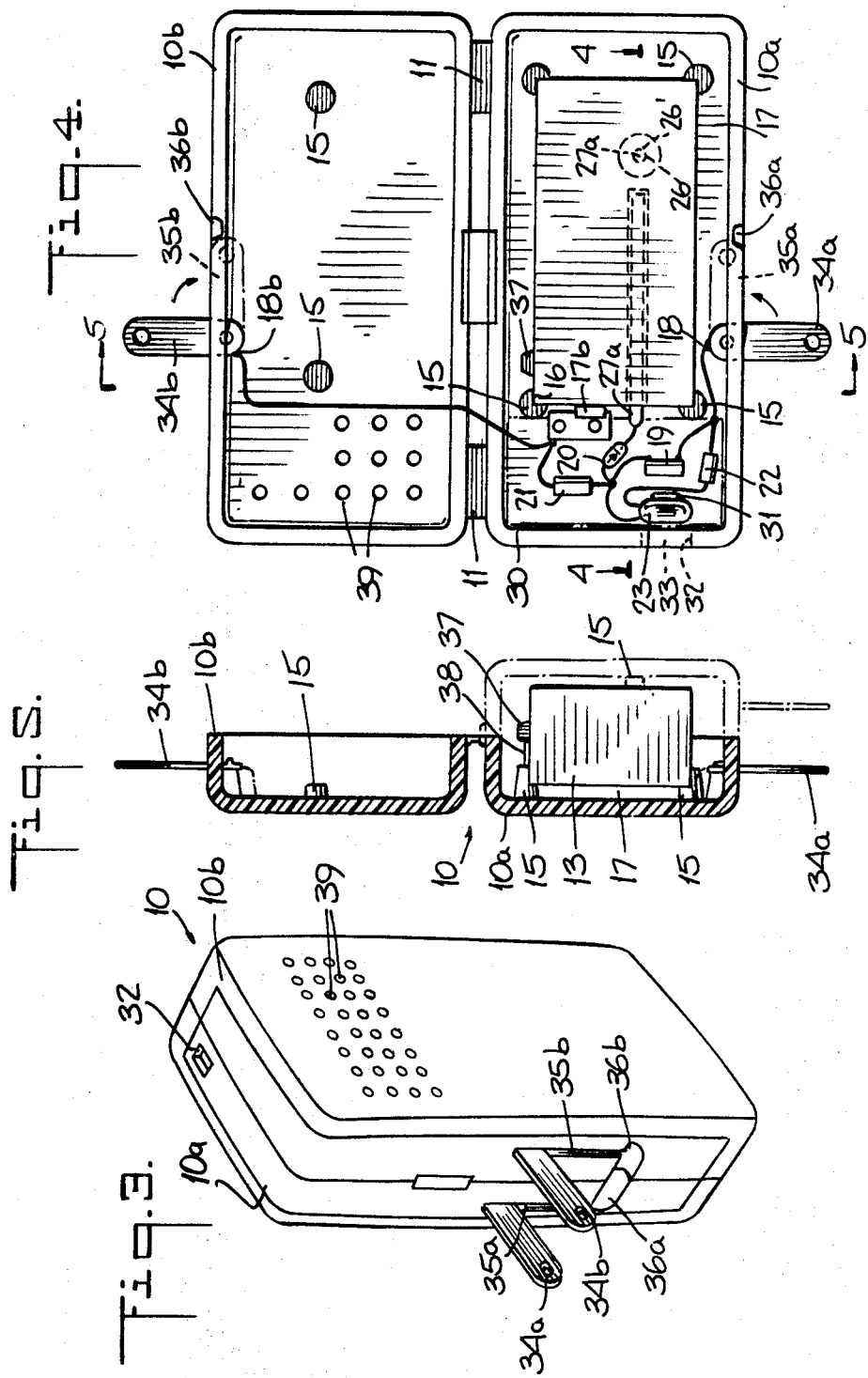

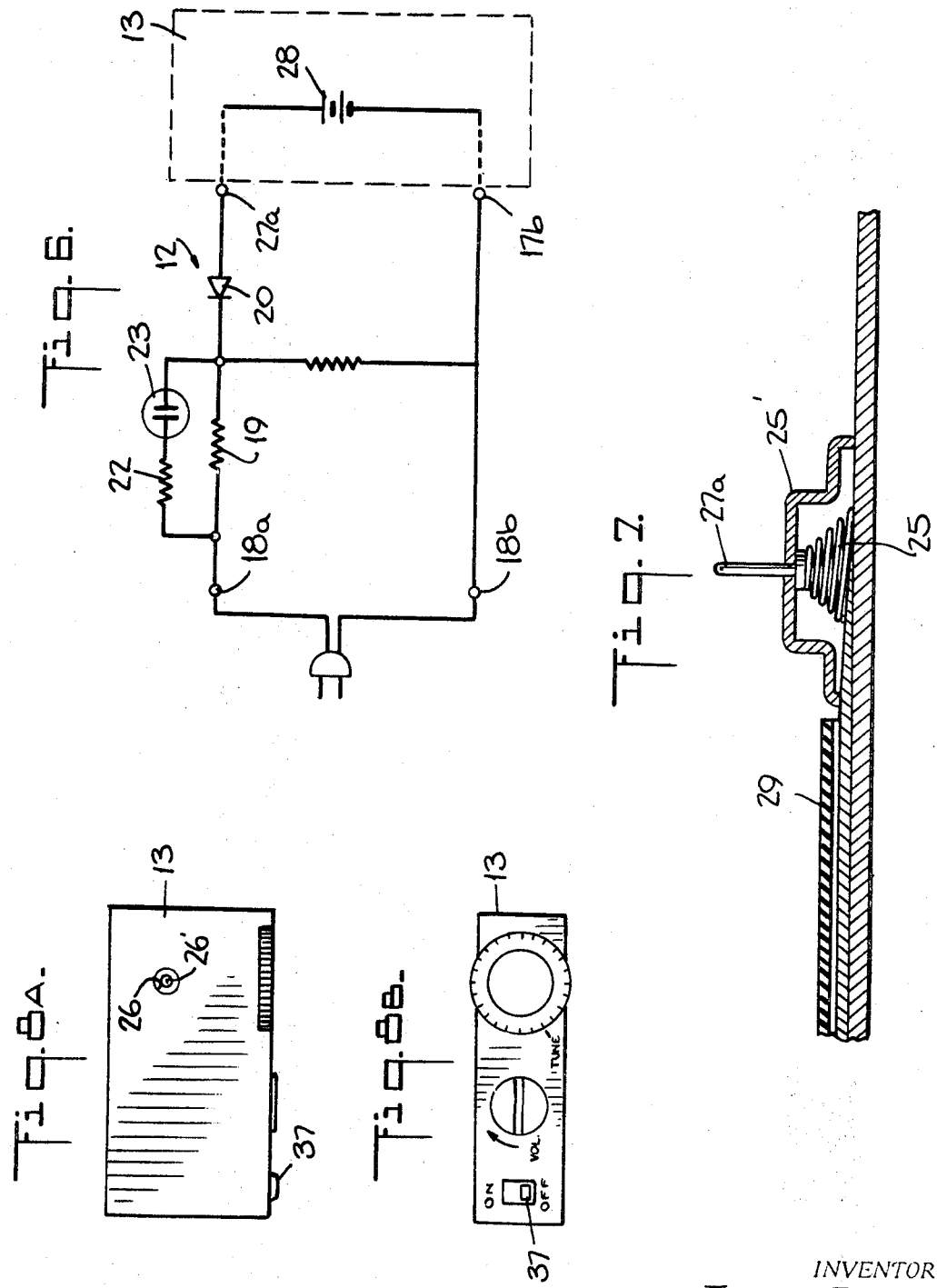

3,519,914
CHARGING APPPARATUS FOR A RADIO, TELEVISION RECEIVER OR THE LIKE
Takayuki Fujimaki and Ikuo Shimizu, Tokyo, Japan, assignors to Sony Corporation, Tokyo, Japan, a corporation of Japan
Filed Sept. 14, 1967, Ser. No. 667,838
Claims priority, application Japan, Sept. 14, 1966, 41/86,585, 41/86,586
Int. Cl. H01m 1/02
U.S. Cl. 320—2         3 Claims

ABSTRACT OF THE DISCLOSURE

The charging apparatus described is used for charging the battery in portable devices such as integrated circuit radios, television receivers and the like. When not in use the device to be charged is stored in the charging apparatus which thereby functions as a vanity case. In order to charge the battery in the portable device, the portable device is inserted in a space provided in the case of the battery charge apparatus. This insertion disconnects the device to be charged so that it does not drain the battery and also connects the battery to the charging contacts. Leads are provided on the charging apparatus for insertion in a standard alternating current outlet to provide charging current for the charging of the battery in the portable device.

---

This invention relates to a battery charging apparatus, and more particularly to a battery apparatus for charging the battery in portable devices such as miniaturized radio and television receivers and similar apparatus.

There are today on the market many devices which operate on batteries in order to make them portable. Among these devices are radio and television receivers, razors, tooth brushes, etc. With devices of this kind the batteries usually must be replaced after a certain period of time. There have been some prior art attempts to provide such devices with batteries that are rechargeable, but as a general rule these prior art devices have either entailed removing the batteries for recharging or else have entailed apparatus which is very expensive and cumbersome. In those prior art devices which have provided batteries that are rechargeable, the devices have been bulky, combersome and expensive, have subjected the user to electrical shocks, and if charged too long have resulted in damage to the battery.

In view of the foregoing, it is the primary object of the present invention to provide a charging apparatus which functions as a carrying case for an electrical device and which can also be utilized to recharge the battery of the electrical device which can be in the form of miniaturized radio or television receivers or similar apparatus.

Another object of the present invention is to provide a charging apparatus for charging the battery of an electrical device and which will protect the user from any electrical shocks.

A further object of the present invention is to provide a charging apparatus for charging the battery of an electrical device and which is simple in construction, is operated from a standard commercial alternating current power source, and which is engaged by the simple insertion of the electrical device in a recess provided in the charging apparatus.

Yet a further object of the present invention is to provide a charging apparatus for charging the battery of an electrical device, and which also serves as a vanity case or carrying case for the electrical device.

These and further objects, features and advantages of the present invention will appear from a reading of the following detailed description of a preferred embodiment of the invention which is to be read in conjunction with the accompanying drawings in which similar components in the several views are identified by some referenced numerals.

In the drawings:

FIG. 1 is a perspective view of the charging apparatus of the present invention.

FIG. 2 is a view similar to FIG. 1 but showing the case of the charging apparatus in an open position and with the electrical contacts in position for insertion in a standard alternating current outlet.

FIG. 3 is a view identical to FIG. 1 but with the charging apparatus prepared for connection with a source of energizing current.

FIG. 4 is a top view of the charging apparatus of the present invention with the top and bottom covers being pivoted to an open position to illustrate the interior of the charging apparatus.

FIG. 5 is a cross section taken on the lines 5—5 of FIG. 4.

FIG. 6 is a schematic electrical diagram of the charger in the charging apparatus of the present invention.

FIG. 7 is a cross section taken on the line 4—4 of FIG. 4 and illustrates the contacting means for interconnecting the device to be charged with the charger in the charging apparatus of the present invention, and FIGS. 8A and 8B are respectively top and front views of an integrated circuit radio containing a battery to be charged by the charging apparatus of the present invention.

Referring now to the drawings, the charging apparatus of the present invention is identified in general by the numeral 10 and, as illustrated in FIG. 1, is in the form of a case or box preferably shaped as a rectangular parallelepiped. The charging apparatus consists of a case or box which has a top cover 10a and a bottom cover 10b which are hingeably connected by a hinge 11. The entire case is preferably made of an insulating material such as polypropylene for a purpose to be presently described.

As illustrated in FIGS. 2 and 4, one of the covers of the case 10 such as the bottom cover 10a is provided with a recessed portion 17 which is adapted to receive the device to be charged, which is identified in general by the numeral 13 and is in the form of an integrated circuit radio. The charger 12 is mounted in the bottom cover 10a adjacent to the recess 17 in such manner as to abut against the device to be charged 13 when it is inserted in the recess 17.

In order to properly align the device to be charged 13 in the recess 17, the recess 17 has mounted therein or formed integrally therewith stoppers 15 in order to properly locate and align the device to be charged 13 when it is inserted in the recess 17. The stoppers or bosses 15 are provided with a notched portion 16 to receive the corners of the radio case 13. Additional bosses 15 are provided on the interior of the top wall 10b of the case 10 for pushing the radio 13 firmly into the recess 17 when the case is closed as illustrated in FIG. 1.

The main case 10 is provided with terminals for connection to the device to be charged 13. As illustrated in FIGS. 4 and 6, the charger 12 contains terminals 18a and 18b for connection to an alternating current power source. One of the terminals 18a is connected to a charging terminal 27a through a resistor 19 and a rectifier 20. The other terminal 18b is connected to the charging terminal 17b. In order to prevent the rectifier 20 from breaking, a shunt resistor 21 is connected between the connection point of the resistor 19, the rectifier 20 and the terminal 18b.

A neon tube 23 together with a series resistor 22 is connected in parallel with the resistor 19. In this manner the lamp 23 indicates when the unit is in a charging condition.

It is preferred that all or some part of the device to be charged 13 consist of a conductive material or metal, and that the battery 28 in the device to be charged 13 be connected to the cabinet as a grounded connection. In this manner when the device to be charged 13 is inserted in the recess 17, it will automatically come in contact with the charging terminal 17b. In addition, the battery 28 in the device to be charged 13 is connected to an electrode 26' which is provided in a hole 26 formed in the wall 10a of the case 10. A pin 27a' of the terminal 27a is provided at a position which corresponds to the electrode 26' of the device to be charged 13. As illustrated in FIG. 7, it is preferred that the pin 27a' be biased in an upward direction by a spring 25. The spring 25 is provided with a cover 25'. In FIG. 7 the numeral 29 identifies the lead and the numeral 24 identifies an insulating sheet for insulating the lead 29 from the conductive cabinet of the device to be charged 13. In this manner when the device 13 to be charged is inserted in the recess 17, the case of the device 13, and accordingly the battery 28, makes contact with the contacts 17a and 27a of the charger 12.

The neon lamp 23 is inserted between the inner wall 30 of the cover 10a of the case 10 and a support member 31 which is molded integrally with the cover 10a. A window 32 is provided in the wall 30 together with a lens 33 to view the neon bulb 23.

The top and bottom covers 10a and 10b of the case 10 are provided with prongs 34a and 34b which together form a plug for insertion in an alternating current outlet. The prongs 34a and 34b are preferably pivotable to a position parallel with the wall of the case 10, and when so pivoted are received in slits or slots 35a and 35b provided in the exterior surface of the top and bottom covers 10a and 10b of the case 10. Grooves 36a and 36b are also provided adjacent the slots 35a and 35b. The purpose of the grooves is to receive a finger to pivot the prongs 34a and 34b to a position perpendicular to the surface of the case 10, such that when the case 10 is in the closed position illustrated in FIG. 3 the prongs 34a and 34b form a plug for insertion in an alternating current outlet.

It is preferred that when the device to be charged 13 is inserted in the case 10, that the main switch 37 be automatically turned off in order to prevent inadvertent drainage of the battery 28 while the device 13 is stored in the case 10. In order to prevent this, a pin 38 is mounted in the recess 17 in such manner as to engage the switch 37 and turn it to an off position when the device 13 is inserted in the recess 17.

In order to facilitate dissipation of heat during charging, radiating holes 39 are provided in the covers of the case 10. These radiating holes are provided adjacent the charger 12.

What has been described is a charging apparatus which can function as a carrying case for the device to be charged or as a vanity case when not in use. When it is desired to recharge the battery in an item such as an integrated circuit radio, the device is inserted in the charging apparatus. This automatically turns the radio off and interconnects the battery with a charger provided in the charging apparatus. Prongs are provided which can be pivoted to form a plug for interconnecting the charging apparatus with a conventional alternating current outlet.

What is claimed is:

1. A charging apparatus for recharging the battery within an electrical device, said apparatus comprising a case including hingedly connected top and bottom covers relatively movable between open and closed positions, one of said covers having a recess for receiving said electrical device when said covers are in said open position and said covers, when in said closed position, enclosing said device therein, charging circuit means mounted in one of said covers, connection means connecting said charging circuit means with the battery of said electrical device upon insertion of the latter in said recess, and first and second plug members connected with said circuit means and being respectively mounted on said top and bottom covers so as to be positionable in parallel, spaced relation to each other for insertion in a convenience receptacle only when said covers are in said closed position thereof.

2. A charging apparatus according to claim 1, in which said electrical device has an on-off switch with a projecting actuating member, and said one cover has an abutment in said recess engageable with said actuating member to dispose said switch in its off position upon insertion of said electrical device in said recess.

3. A charging apparatus according to claim 1, in which each of said plug members is pivoted on the respective cover, and the latter has a slot in the exterior surface thereof within which the respective plug member can be accommodated by pivoting to a stowed position.

References Cited

UNITED STATES PATENTS

| 2,982,849 | 5/1961 | Volkerling et al. | 320—51 X |
| 2,995,695 | 8/1961 | Reich | 320—2 |
| 3,209,230 | 9/1965 | Mas | 320—2 |
| 3,257,599 | 6/1966 | Somers et al. | 320—2 |

FOREIGN PATENTS 871,604   5/1942   France.

LEE T. HIX, Primary Examiner

J. M. GUNTHER, Assistant Examiner

U.S. Cl. X.R.

320—51